(12) United States Patent
Byun et al.

(10) Patent No.: US 8,533,858 B2
(45) Date of Patent: Sep. 10, 2013

(54) DOMAIN MANAGEMENT METHOD AND DOMAIN CONTEXT OF USERS AND DEVICES BASED DOMAIN SYSTEM

(75) Inventors: Young Bae Byun, Seoul (KR); Bum Suk Choi, Daejeon (KR); Hyon-Gon Choo, Busan (KR); Sang Hyun Ju, Daejeon (KR); Je Ho Nam, Daejeon (KR); Jin Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1474 days.

(21) Appl. No.: 11/909,105

(22) PCT Filed: Apr. 7, 2006

(86) PCT No.: PCT/KR2006/001286
§ 371 (c)(1),
(2), (4) Date: Sep. 19, 2007

(87) PCT Pub. No.: WO2006/107185
PCT Pub. Date: Oct. 12, 2006

(65) Prior Publication Data
US 2009/0235330 A1      Sep. 17, 2009

(30) Foreign Application Priority Data

Apr. 8, 2005    (KR) ........................ 10-2005-0029654

(51) Int. Cl.
*G06F 21/10* (2013.01)
(52) U.S. Cl.
USPC ................................................ 726/29; 726/1
(58) Field of Classification Search
USPC ................... 726/2–4, 29; 713/168, 169, 175
See application file for complete search history.

(56) References Cited

U.S. PATENT DOCUMENTS

| 6,460,023 | B1 * | 10/2002 | Bean et al. ...................... 705/54 |
| 7,251,826 | B1 * | 7/2007 | Gardos et al. ..................... 726/6 |
| 7,441,117 | B2 | 10/2008 | Matsuzaki et al. |
| 7,725,399 | B2 | 5/2010 | Nakahara et al. |
| 2002/0157002 | A1 | 10/2002 | Messerges et al. |

(Continued)

FOREIGN PATENT DOCUMENTS

| JP | 2003-323343 A | 11/2003 |
| JP | 2004-015527 A | 1/2004 |

(Continued)

OTHER PUBLICATIONS

Takeda Yasuma; "Thorough Explanation Building of Samba LDAP server", Dec. 25, 2004 First Printing of First Edition, Gijutsu-Hyohron Co., Ltd. (Publishing Company), Tokyo, 8 Pages.

*Primary Examiner* — Eleni Shiferaw
*Assistant Examiner* — Abu Sholeman
(74) *Attorney, Agent, or Firm* — Ladas & Parry LLP

(57) ABSTRACT

Provided are domain contexts indicating user and device based domain systems for being applied to a new digital content protection/management system, and management methods thereof. A concept of "domain" is introduced in the present invention so that various business models can be obtained in accordance with content use of one home or small-sized group. The domain refers to as a group of user and device SAV and PAV indicating a context for being applied to the domain system includes: a domain identifier for specifying a domain as a region containing at least one content execution device and at least one content user; domain authentication information for guaranteeing authenticity of the domain; a user list containing information of users belonging to the domain; and a device list containing devices belonging to the domain.

10 Claims, 12 Drawing Sheets

(56) References Cited

U.S. PATENT DOCUMENTS

| | | |
|---|---|---|
| 2003/0076955 A1 | 4/2003 | Alve et al. |
| 2003/0097580 A1* | 5/2003 | Chang ........................... 713/194 |
| 2003/0163722 A1* | 8/2003 | Anderson, IV ............... 713/200 |
| 2004/0039906 A1 | 2/2004 | Oka et al. |
| 2004/0103312 A1 | 5/2004 | Messerges et al. |
| 2004/0210756 A1* | 10/2004 | Mowers et al. ............... 713/168 |
| 2004/0250077 A1* | 12/2004 | Jang et al. ..................... 713/175 |
| 2005/0039019 A1* | 2/2005 | Delany ........................... 713/176 |
| 2005/0086514 A1* | 4/2005 | Han et al. ...................... 713/200 |
| 2005/0182727 A1* | 8/2005 | Robert et al. .................... 705/51 |
| 2005/0273344 A1* | 12/2005 | Lee et al. .......................... 705/1 |
| 2006/0021065 A1* | 1/2006 | Kamperman et al. ........... 726/28 |
| 2006/0101155 A1* | 5/2006 | Damour et al. ............... 709/238 |
| 2007/0168665 A1* | 7/2007 | Kim et al. ...................... 713/171 |
| 2007/0226811 A1* | 9/2007 | Kamperman et al. ........... 726/30 |
| 2008/0229387 A1* | 9/2008 | Baks et al. ......................... 726/1 |
| 2008/0244706 A1* | 10/2008 | Lenoir et al. ...................... 726/4 |
| 2010/0067705 A1* | 3/2010 | Boccon-Gibod et al. ..... 380/285 |

FOREIGN PATENT DOCUMENTS

| | | |
|---|---|---|
| JP | 2004-015530 A | 1/2004 |
| JP | 2004-120736 A | 4/2004 |
| JP | 2004-280796 | 10/2004 |
| JP | 2005-243016 A | 9/2005 |
| JP | 2007-501967 A | 2/2007 |
| JP | 2007-524895 A | 8/2007 |
| KR | 1020010006888 | 1/2001 |
| KR | 1020010050111 | 6/2001 |
| KR | 1020010111001 | 12/2001 |
| KR | 1020020028692 | 4/2002 |
| KR | 1020020066233 | 8/2002 |
| KR | 1020040000713 | 1/2004 |
| KR | 1020060041876 | 5/2006 |
| KR | 1020060041879 | 5/2006 |
| WO | 01/18628 A2 | 3/2001 |
| WO | 03/098931 A1 | 11/2003 |
| WO | WO 2004/023275 | 3/2004 |
| WO | 2004/079545 A2 | 9/2004 |
| WO | 2005/010879 A2 | 2/2005 |

\* cited by examiner

DOMAIN MANAGEMENT METHOD AND DOMAIN CONTEXT OF USERS AND DEVICES BASED DOMAIN SYSTEM

TECHNICAL FIELD

The present invention relates to a domain context indicating a user and device based domain system in a new digital content protection/management system, and a method of managing the same. More particularly, the present invention relates to a domain context of a system for designating a plurality of users and/or a plurality of devices to one domain.

BACKGROUND ART

Digital contents have a superior quality to conventional analog contents and are conveniently manipulated. However, the digital contents can be copied by unlimited times, increasing the possibility and range of copyright infringement. In particular, the copyright infringement is severe when digital broadcast provides easily copied digital contents to a great number of subscribers. Accordingly, as digital content protection gets important with the development of a digital industry, various types of Digital Rights Management (DRM) schemes have been developed.

To solve the above-described problem, a conventional digital content protection/management system transmits digital contents in the entirely or partially encoded form, and a digital content execution device decodes the encoded contents using a stored security key from an external server and reproduces the contents.

However, the subscriber management based on the security key on the conventional digital content protection/management system was limited only to a method of providing an authority of executing digital contents to each subscriber or a method of providing the authority to each content execution device.

This does not consider that each subscriber has various digital content devices and each member of one home wants to enjoy digital contents together. Accordingly, the conventional digital content protection/management system makes the use of the digital content inconvenient and obstructs activation of a digital content providing industry.

DISCLOSURE

Technical Problem

The present invention is directed to a domain management system that considers that one user has a plurality of content execution devices and/or that several users are included in one domain.

Technical Solution

A term, "domain" is introduced in the present invention. This term is in contrast with a "domain in a broadcast station" that is a collection of servers in the broadcast station. One example of the "domain" of the present invention may include a "home domain" implemented by devices and members belonging to a home.

That is, a domain refers to a group of users and devices SAV and PAV belonging to the domain. Each domain may include several users and devices. Elements of the domain are defined as follows.

Domain administrator: A user having an administrator account in a domain, and having an authority to manage everything related to the domain including registration and revocation of users and the domain.

Domain user: A user belonging to a domain and permitted to reproduce contents using a device permitted for use.

Domain device: A device belonging to a domain. At least one of domain users should be allocated to each device.

For a domain administrator in charge of security in content providing service based on a domain, it is required to register a domain administrator (having a domain manager account) that manages all matters related to the domain and is responsible for settlement when registering a new domain. One domain needs to include at least one domain administrator, and the domain administrator is vested with a duty for all settlements for use of contents in the domain user and device. That is, the domain administrator should perform all settlements on the domain.

As described above, the introduction of the "domain" allows various business models to be obtained from the use of contents in one home or a small-sized group. Various service providing manners can be created in using contents with an intellectual property management and protection (IPMP) tool by adding an individual item of a user and a device to a license context, thereby satisfying demands of copyrighters and/or copyright consumers.

One aspect of the present invention provides a domain context comprising a domain identifier for specifying a domain as a region containing at least one content execution device and at least one content user; domain authentication information for guaranteeing authenticity of the domain; a user list containing information of users belonging to the domain; and a device list containing devices belonging to the domain.

Advantageous Effects

As described above, according to a domain management method of the invention, use of contents with an IPMP policy can be controlled in various forms and manner, thereby surely performing copyright protection and management.

In addition, various service providing manners can be created in using contents with an IPMP tool, thereby satisfying demands of copyrighters and/or copyright consumers.

In addition, many devices can be classified and managed as a group called a domain, thereby mitigating a management load of a clearing house.

MODE FOR INVENTION

Hereinafter, exemplary embodiments of the present invention will be described in detail with reference to accompanying drawings. However, the present invention is not limited to the exemplary embodiments disclosed below, but can be implemented in various types. Two embodiments are given in accordance with whether or not a domain control is present, and a description which can be the same as each other will be skipped in any of the two embodiments.

First Embodiment

In a domain system at the side of a user according to the present embodiment, a domain is defined using a plurality of users and a plurality of devices instead of using a separate domain controller. Since there is no domain controller, a clearing house plays a major role in operating the domain such as storing information about the domain, writing a modified matter of the domain, and the like. In the present embodiment, the clearing house is implemented by a certificate authority and a domain manager. Alternatively, the clearing house may be implemented as one entity.

Figure 1:
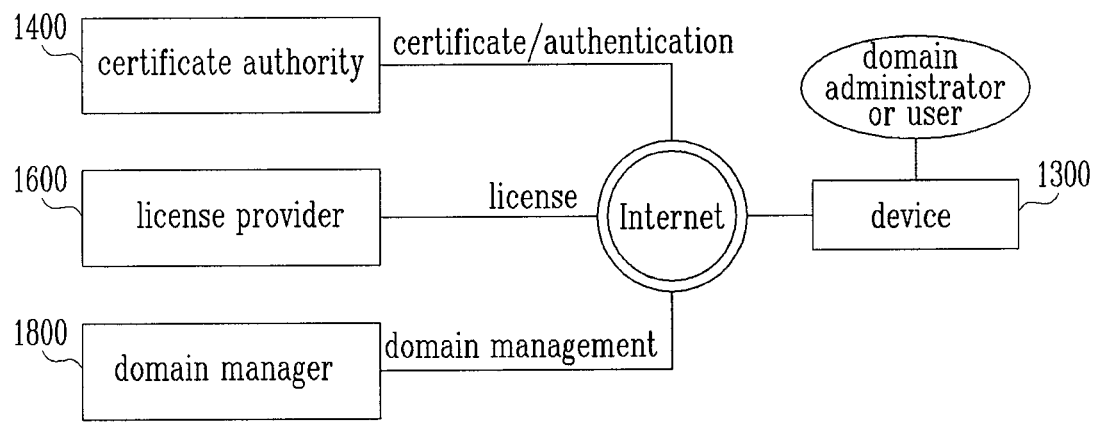
FIG. 1 is a structural diagram of a user and device based domain system according to an exemplary embodiment of the present invention.

A structure of the home domain system of the present embodiment will first be described. FIG. 1 shows the structure of a content protection management system including the home domain according to the present embodiment.

A certificate authority 1400 issues certificates for users and devices which are elements of the domain, a license provider 1600 is an internal server of a service provider distributing digital contents and is in charge of issuing a license required for using the contents, and the domain manager 1800 is in charge of including or revoking the user and device 1300 to and from the domain and transmitting a domain key, a user key, and a device key which are required for making a license.

Elements of a user/device based domain include users and the devices. Among users, a user who performs all tasks including a task of creating one domain and a task of including or removing users and/or devices into or from the domain is called a domain administrator. At least one domain administrator should be included in one domain, and one user may be an administrator of several domains, and the domain administrator is vested with all settlements with respect to use of contents by users and devices.

The domain user indicates a user in one domain permitted to consume contents using his/her device among devices in the domain.

The domain device 1300 is a device included in the domain, and each device should be allocated to at least one of domain users. If a device is not allocated to a user, authority to use the device may be considered to suspend.

Hereinafter, management data used for the domain management method according to the present embodiment will be described. Data structures of a domain context including information about the domain, a user context including information about each user belonging to the domain, and a device context including information about each device belonging to the domain will be described. In the following description, the domain context will be referred to as domain management information, the user context as a domain user resource, and the device context as a domain device resource.

Figure 2:
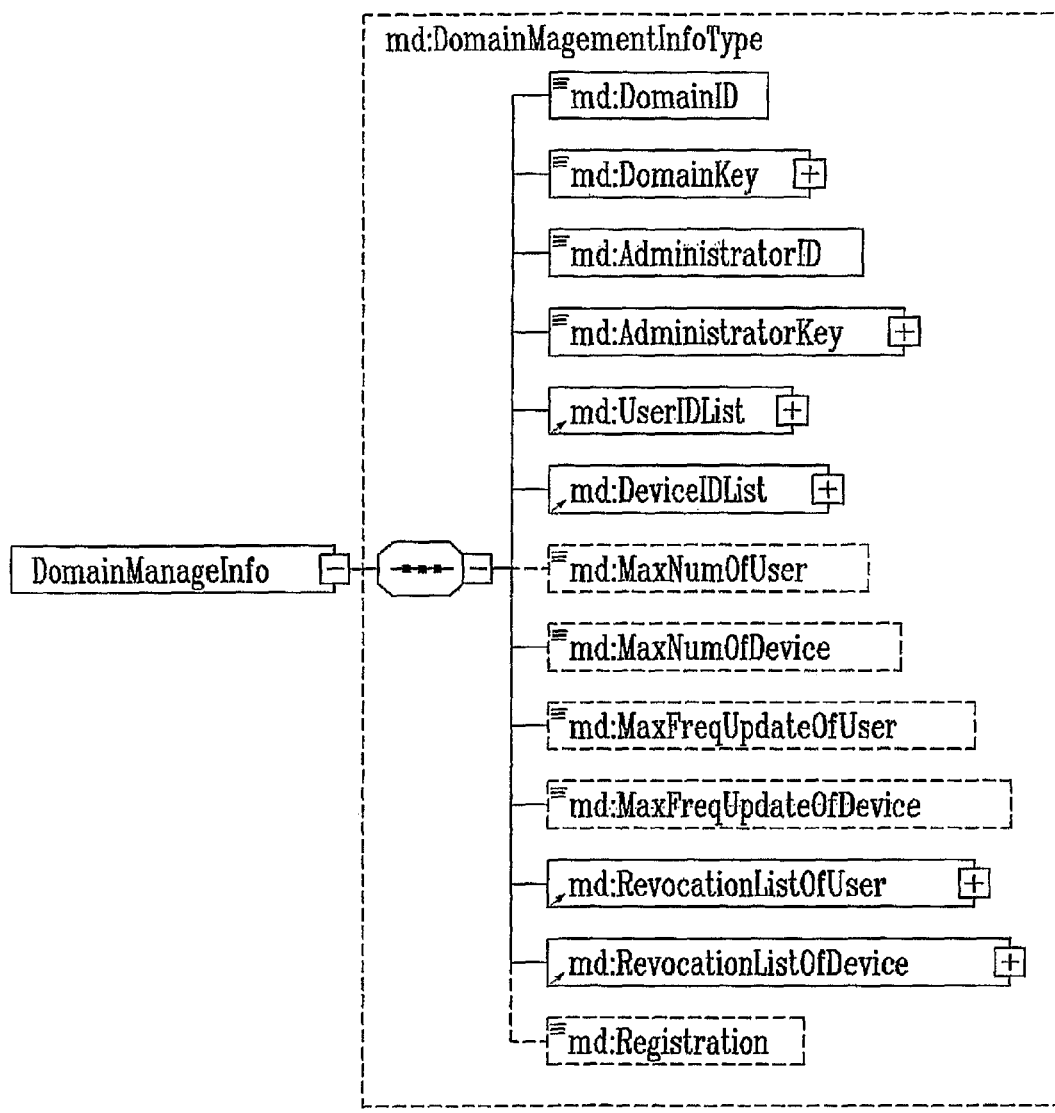
FIG. 2 is an XML schema diagram of the structure of domain management information according to an exemplary embodiment of the present invention.

When one domain is created, the domain manager creates and manages domain management information (DMI) as shown in FIG. 2. Items included in the DMI are as follows.

1) DomainID: This ID is allocated to each domain in a non-overlapping manner upon new domain registration, and is managed until the registered domain is canceled (terminated)

Figure 3:
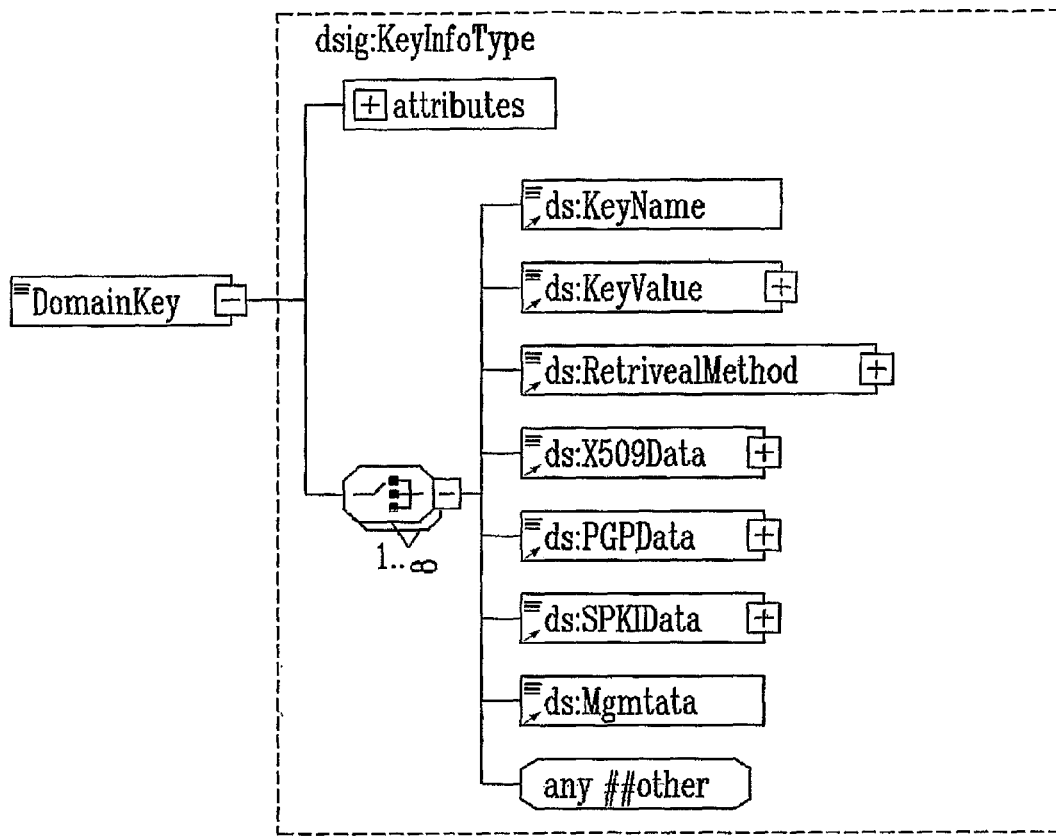
FIG. 3 is an XML schema diagram of the structure of a domain key according to an exemplary embodiment of the present invention.

2) DomainKey: Domain key is defined as having a structure as shown in FIG. 3, and is created by the domain manager upon domain registration. This key can be updated for management, if necessary. The domain key can be replaced by a domain certificate, and may be managed by simply storing a pair of asymmetric keys of the domain.

3) AdministratorID: At least one domain administrator should be registered for all domains. This ID is allocated to the domain administrator in a non-overlapping manner upon new domain registration, and is used for verifying the user upon future domain management.

4) AdministratorKey: This key is input when the domain administrator registers the domain, and is a password to be used for verifying the administrator upon domain management.

Figure 4:
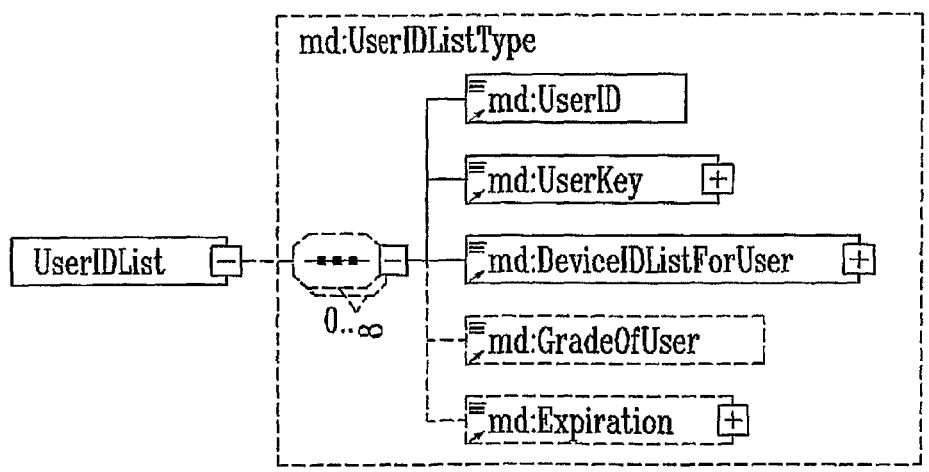
FIG. 4 is an XML schema diagram of the structure of a user ID list according to an exemplary embodiment of the present invention.
Figure 5:
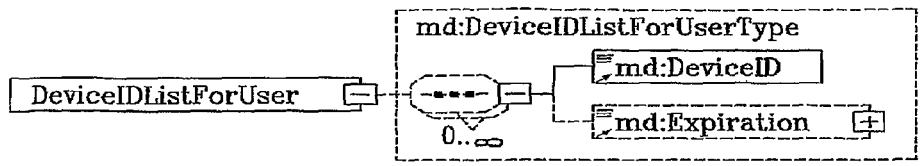
FIG. 5 is an XML schema diagram of the structure of a device ID list for a user according to an exemplary embodiment of the present invention.

5) UserIDList: A list of IDs of users included in a domain as shown in FIG. 4. The DeviceIDListForUser included in this list indicates a list of IDs of domain devices permitted for use by a user, as shown in FIG. 5.

Figure 6:
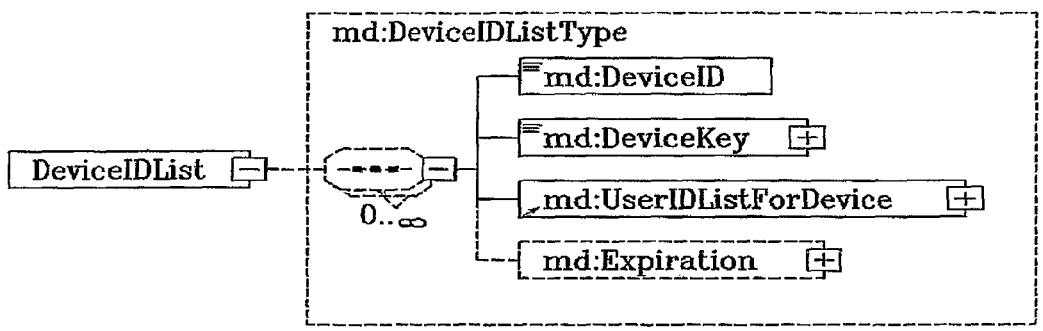
FIG. 6 is an XML schema diagram of the structure of a device ID list according to an exemplary embodiment of the present invention.
Figure 7:
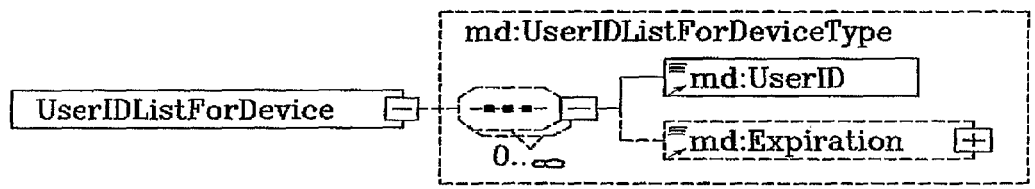
FIG. 7 is an XML schema diagram of the structure of a user ID list with respect to a device according to an exemplary embodiment of the present invention.

6) DeviceIDList: A list of IDs of devices included in the domain as shown in FIG. 6. The UserIDListForDevice included in this list indicates a list of IDs of domain users permitted for use of a device as shown in FIG. 7.

7) MaxNumOfUser: This item is the maximum number of users that can be included in one domain. This number may be limited by a contract between the user and the content service provider.

8) MaxNumOfDevice: This item is the maximum number of devices that can be included in one domain. This number may be limited by a contract between the user and the content service provider.

9) MaxFreqUpdateOfUser: This is used for limiting the frequency number of updating domain users in order to mitigate a load on a domain manager that may be caused by too frequently registering or revoking domain users. This item may be limited by a contact between the user and the content service provider.

10) MaxFreqUpdateOfDevice: This is used for limiting the frequency number of updating the domain devices in order to mitigate a load on a domain manager that may be caused by too frequently registering or revoking domain devices. This item may be limited by a contact between the user and the content service provider.

Figure 8:
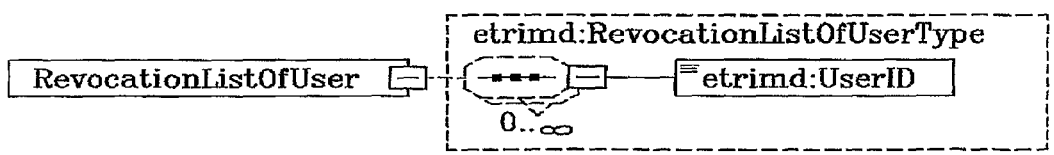
FIG. 8 is an XML schema diagram of the structure of a canceled user list according to an exemplary embodiment of the present invention.

11) RevocationListOfUser: An ID of a user is added to this list for management as shown in FIG. 8 when the user is revoked from the domain.

Figure 9:
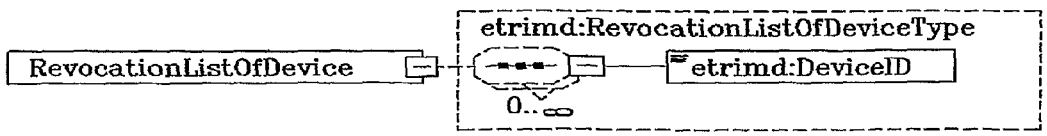
FIG. 9 is an XML schema diagram of the structure of a canceled device ID list according to an exemplary embodiment of the present invention.

12) RevocationListOfDevice: An ID of a device is added to this list for management as shown in FIG. 9 when the device is revoked from the domain.

13) Registration: This stores a date at which a new domain is created and registered.

In summary, the DMI is created when the domain administrator registers a new domain according to a contract with the service provider, and is removed when the contract is canceled. One user may create several domains according to the contract with a plurality of service providers, and uses a domain administrator ID and a password registered in each DMI in order to managing each domain. To use a content, the domain administrator needs to be registered as a domain user and will have a domain user resource.

In including a user in the domain, the domain administrator needs to include the user to the domain through the domain manager. In this case, the domain manager creates a domain user resource as shown in FIG. 10 and delivers it to the domain administrator, and the domain administrator should deliver it to the domain user.

Figure 10:
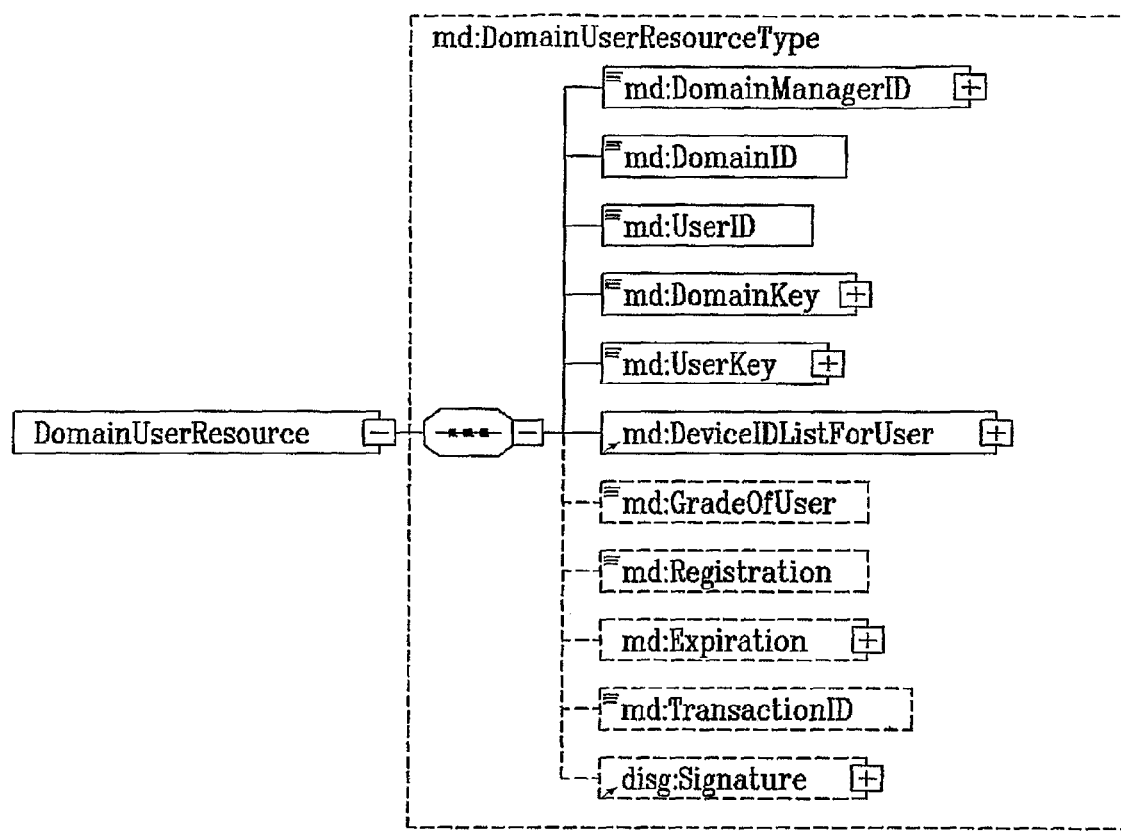
FIG. 10 is an XML schema diagram of the structure of a domain user resource according to an exemplary embodiment of the present invention.

The domain user resource is composed of 11 items as shown in FIG. 10. In particular, the item DeviceIDListForUser (valid device list) is a list of domain devices permitted for use by a domain user, and includes a DeviceID of each permitted domain device as shown in FIG. 5. The device list may be designated when a domain user is newly registered, or may be separately designated later. If the domain device does not need to be allocated for the domain user, GradeOfUser may be used instead.

Figure 11:
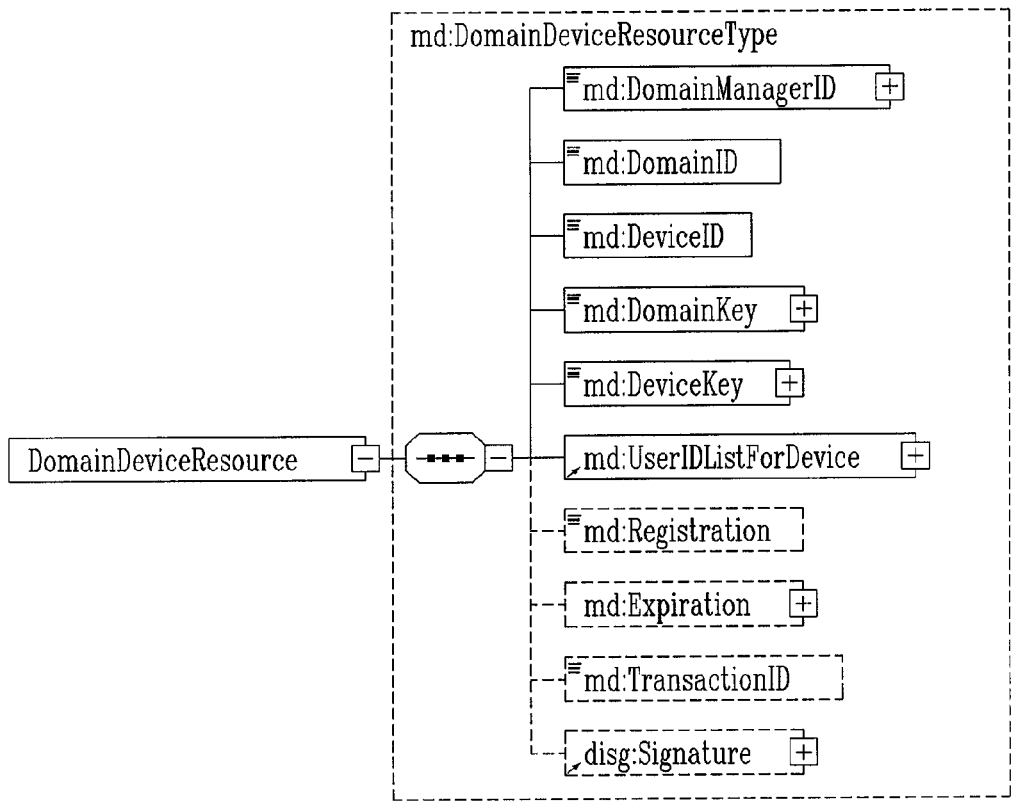
FIG. 11 is an XML schema diagram of the structure of a domain device resource according to an exemplary embodiment of the present invention.

In including a device having a networking function in the domain, the domain manager creates the domain device resource as shown in FIG. 11 and delivers it to the corresponding device when the domain administrator includes the device in the domain using the corresponding device through the domain manager. In including a device having no networking function in the domain, the domain administrator uses a device information extraction utility provided by the domain manager to extract the information of the corresponding device and carries out the registration of the device. And the domain device resource issued by the domain manager should be input to the corresponding device by the domain administrator.

The domain device resource is composed of 10 items as shown in FIG. 11. UserIDListForDevice (valid device list) is a list of users permitted to use a domain device, and includes a UserID of each permitted domain user or the like as shown in FIG. 7. This list of users may be designated when a domain device is newly registered, or may be separately designated later.

DeviceKey may be encoded and stored using specific information extracted by the device information extraction utility provided by the domain manager. DeviceKey is valid only within a corresponding device because the specific information needs to be used to access the domain device resource.

A grade of a device may be defined by defining and using a grade of a user GradeOfUser as shown in FIG. 10. When permitted users use a corresponding device, the grade of the device can be defined according to the grades of the users.

A method of registering and revoking a domain, adding and revoking a user, and adding and revoking a device in the domain system according to the present embodiment will now be described.

Preferably, authority to request a domain management task is verified in advance prior to performing tasks required between the device and the domain manager as shown in FIGS. 12 to 20. Accordingly, prior to performing each required task, the device transmits a certificate or ID and password of the domain administrator to the connected domain manager connected using the certificate or the ID and password (S1110), and the domain manager inquires the received administrator authentication information from its internal database to verify whether the administrator is a valid domain administrator (S1120) and transmits an acknowledgement signal to the connected device (S1130).

Figure 12:
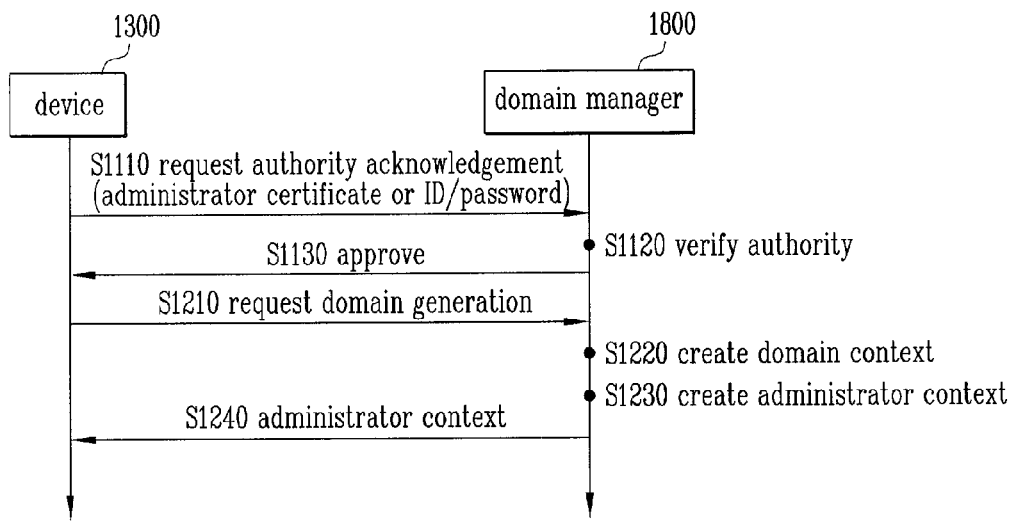
FIG. 12 is a flowchart of a domain registration method according to an exemplary embodiment of the present invention.

In order to create (register) a domain, the domain administrator requests the domain manager 1800 to create the domain (S1210 of FIG. 12). The domain manager 1800 creates the domain and stores DMI (S1220), and creates a domain user resource of the domain administrator to transmit it to the device 1300, which has requested to create the domain (S1240). That is, the domain user resource of the domain administrator is created and allocated upon domain registration.

In the new registration procedure, the domain manager 1800 may allocate one domain identifier to a new subscriber, and may receive information about the user and/or device belonging to the new domain from the device 1300 which has requested the registration.

Essential information about the domain such as an identifier of the domain to be newly added, location information, domain administrator information, and additional information about the user and/or device included in the new domain can be recorded on the internal database of the domain manager 1800. In addition, the device 1300 can store the newly registered domain certificate and/or the domain administrator resource which have/has received from the domain manager in its internal memory. In addition, it can store DMI indicating a structure of the domain associated with the domain user and the domain device in the internal memory. The DMI can be stored in an internal/external database of the domain manager 1800. For the newly registered domain, the user who has carried out the corresponding registration task can be set as a domain administrator as a default.

Figure 13:
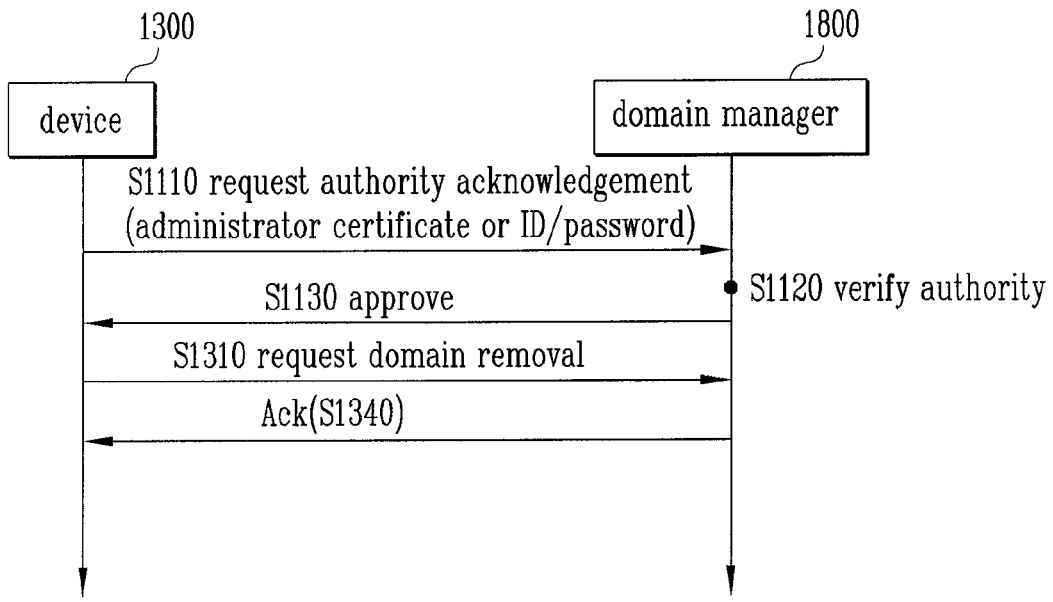
FIG. 13 is a flowchart of a domain registration cancel method according to an exemplary embodiment of the present invention.

In removing the created domain, the domain administrator requests the domain manager 1800 to remove the domain (S1310 of FIG. 13). After removing the domain, the domain manager 1800 notifies the device 1300 of the domain removal completion (S1340). When the domain is removed, all domain resources of the user and device included in the corresponding domain become invalid. Alternatively, data associated with the domain stored in the domain manager 1800 may be removed, or may be retained for a predetermined time in consideration of the revocation of the domain removal.

Figure 14:
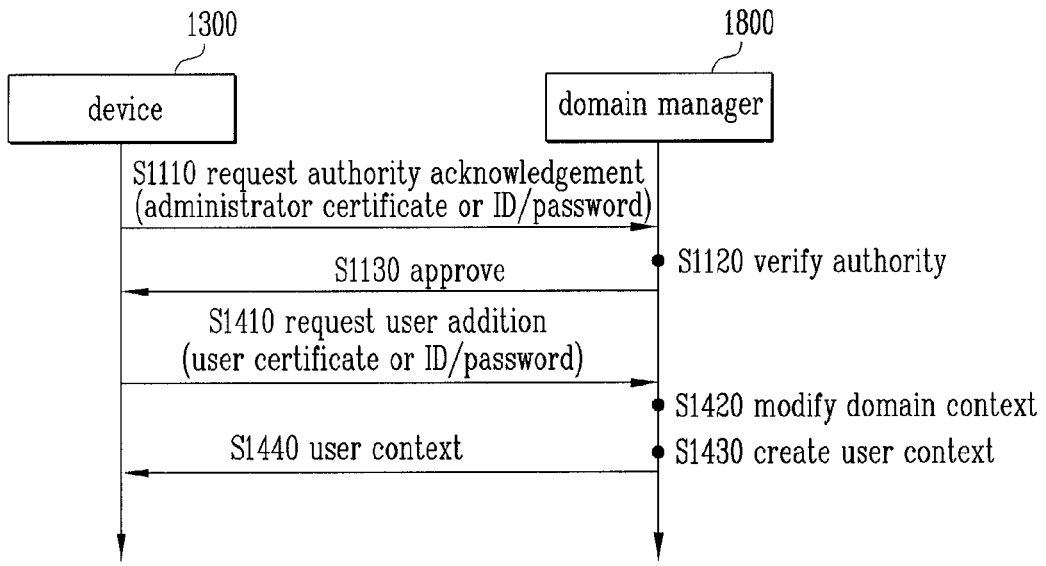
FIG. 14 is a flowchart of a domain user registration method according to an exemplary embodiment of the present invention.

In adding (registering) the user to the created domain, the domain administrator requests the domain manager 1800 to add the user (S1410), as shown in FIG. 14. The domain manager 1800 modifies the DMI to add the corresponding user (S1420), and creates a domain user resource for the added user (S1430) to transmit it to the device 1300 which has requested the user addition (S1440). That is, the domain user resource for the added user is created upon the user addition and is transmitted to the device 1300.

Figure 15:
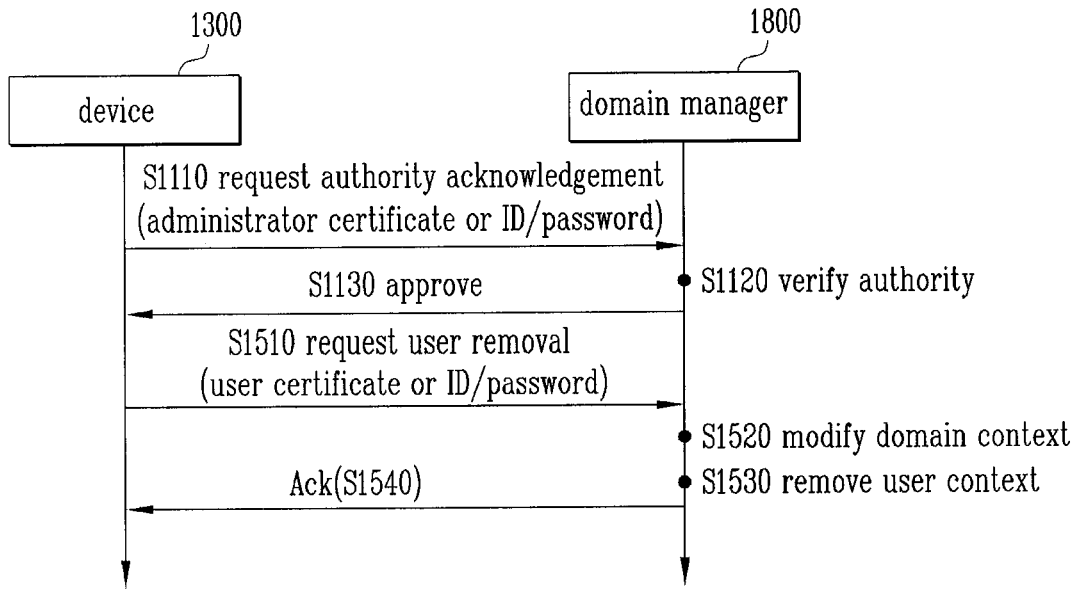
FIG. 15 is a flowchart of a domain user removal method according to an exemplary embodiment of the present invention.

In revoking the user from the domain, the domain administrator requests the domain manager 1800 to revoke the user (S1510 of FIG. 15). The domain manager 1800 modifies the DMI to revoke the user (S1520), and notifies the device 1300 of the user revocation completion (S1540). Alternatively, data associated with the user stored in the domain manager 1800 may be removed (S1530), or may be retained for a predetermined time. Further, a user change task may include a task of revoking an existing user and a task of adding a new user.

Figure 16:
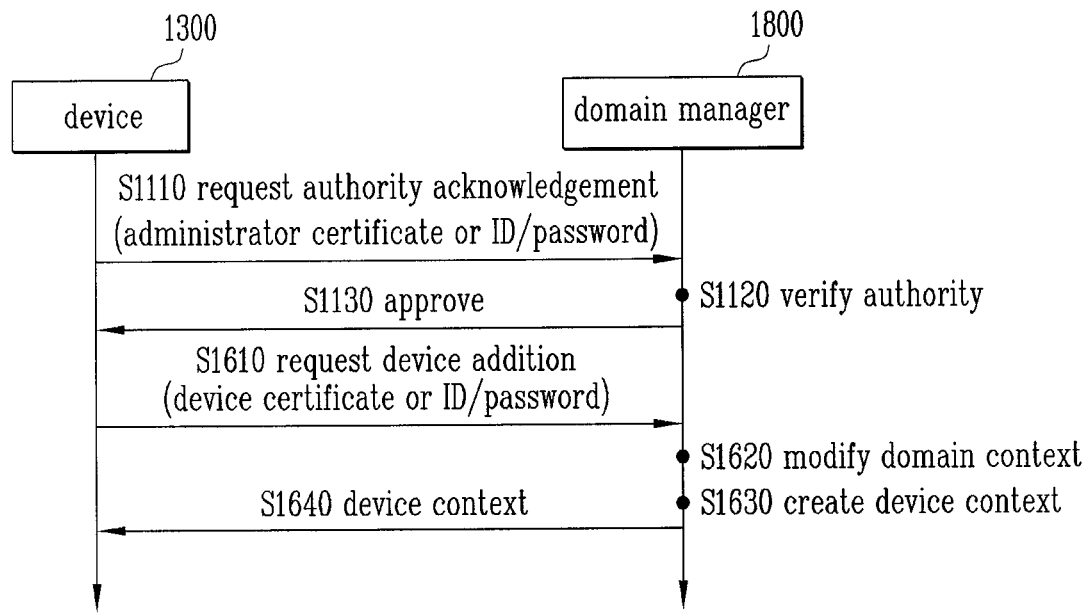
FIG. 16 is a flowchart of a domain device registration method according to an exemplary embodiment of the present invention.

In adding (registering) the device to the created domain, the domain administrator requests the domain manager 1800 to add the device (S1610 of FIG. 16). The domain manager 1800 modifies the DMI to add the corresponding device (S1620), and creates a domain device resource with respect to the added device (S1630) to transmit it to the device 1300 which has requested the device addition (S1640). That is, the domain device resource for the added device is created upon the device addition and is transmitted to the device 1300 which has requested the device addition.

Figure 17:
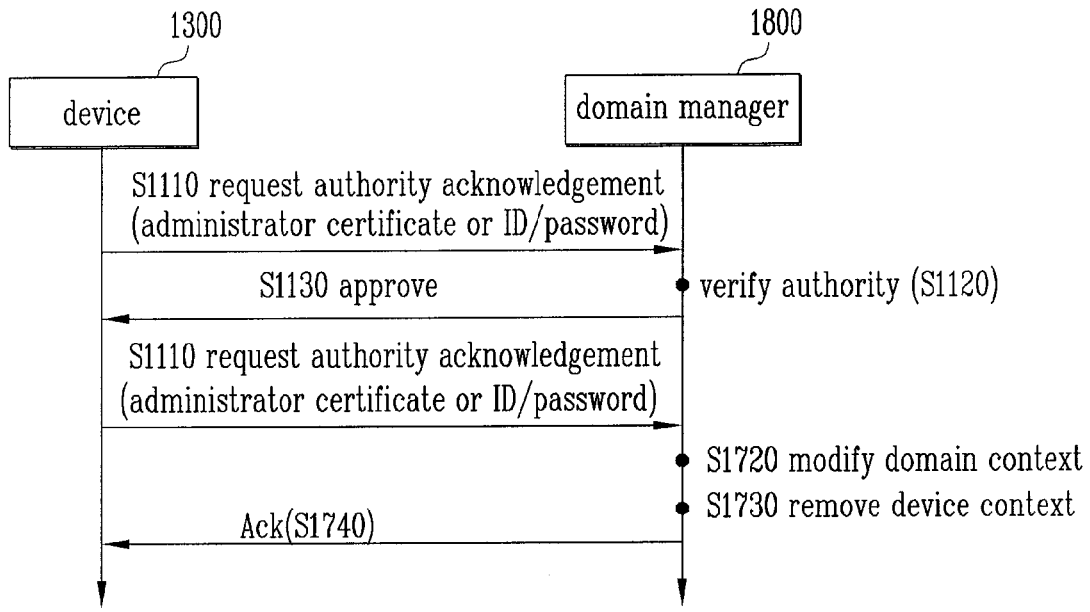
FIG. 17 is a flowchart of a domain device removal method according to an exemplary embodiment of the present invention.

In revoking the device from the domain, the domain administrator requests the domain manager 1800 to revoke the device (S1710 of FIG. 17). The domain manager 1800 modifies the DMI to revoke the device (S1720), and notifies the device 1300 which has requested the device removal of the device removal completion (S1740). Alternatively, data associated with the device stored in the domain manager 1800 may be removed (S1730), or may be retained for a predetermined time.

In the meantime, the device change task may include a task of revoking an existing device and a task of adding a new device. Alternatively, during the addition and revocation of the device, a hardware identification that is a unique value for each multimedia reproduction device to be added or revoked may be transmitted to the domain manager 1800.

Figure 18:
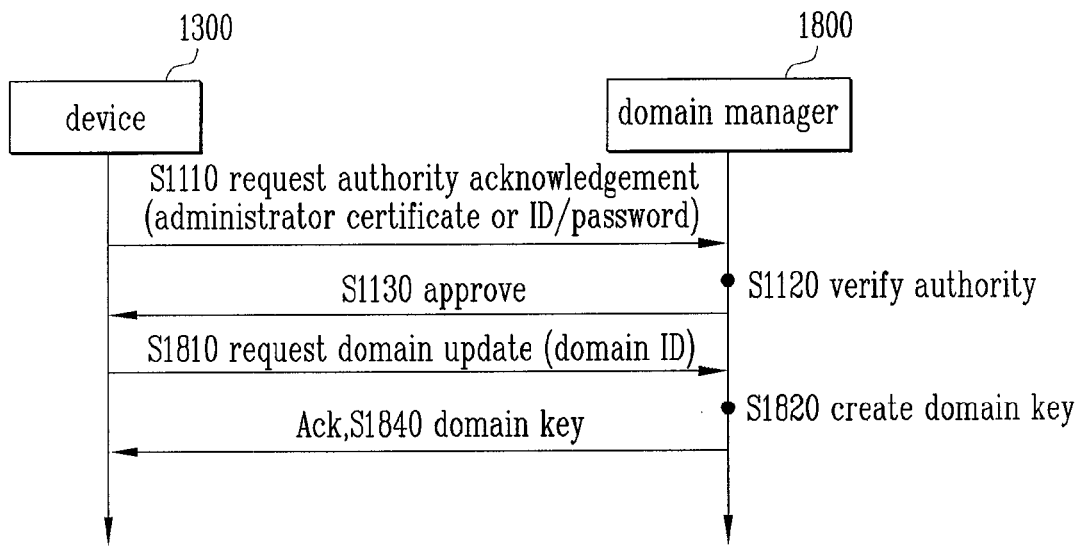
FIG. 18 is a flowchart of a domain update method according to an exemplary embodiment of the present invention.

In updating the domain registered in the domain manager 1800, the domain administrator requests the domain manager 1800 to update the domain (S1810 of FIG. 18). The domain manager 1800 updates a domain security means (S1820), and transmits it to the device 1300 which has requested the domain update (S1840). While a domain key has been shown in FIG. 18 as the domain security means, the domain security means may be implemented by another security means such as a domain certificate. The device 1300 which has received the updated domain security means may include and store it in the DMI.

Figure 19:
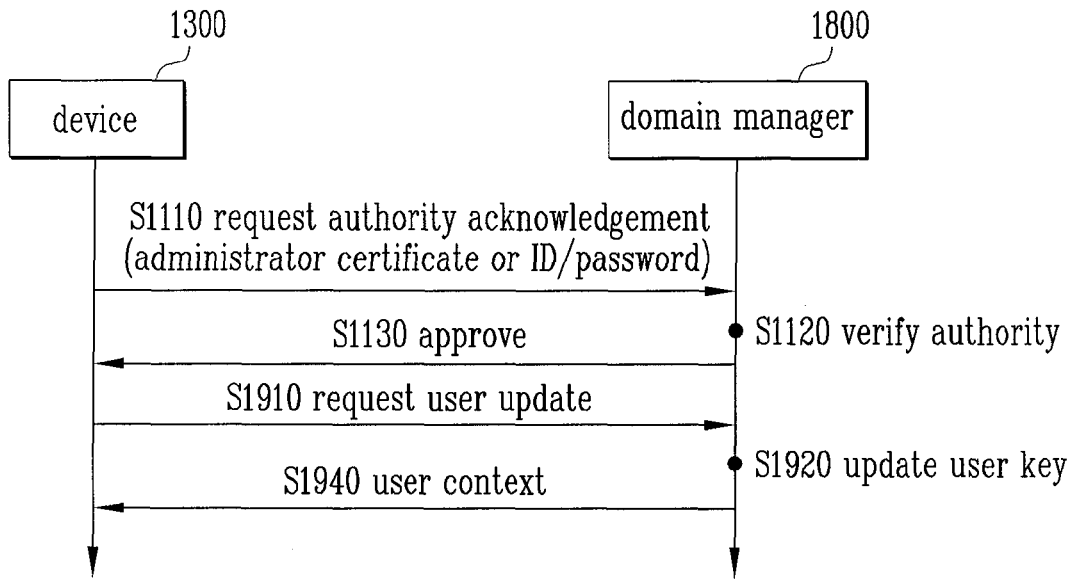
FIG. 19 is a flowchart of a user update method according to an exemplary embodiment of the present invention.

In updating the user registered in the domain manager 1800, the domain administrator requests the domain manager 1800 to update the user (S1910 of FIG. 19). The domain manager 1800 updates a user security means (S1920), and transmits a domain user resource including the user security means to the device 1300 which has requested the user update (S1940). While a user key has been shown in FIG. 19 as the user security means, the user security means may be implemented as another security means such as a certificate. The device 1300 which has received the updated domain user resource may store it in its internal memory.

Figure 20:
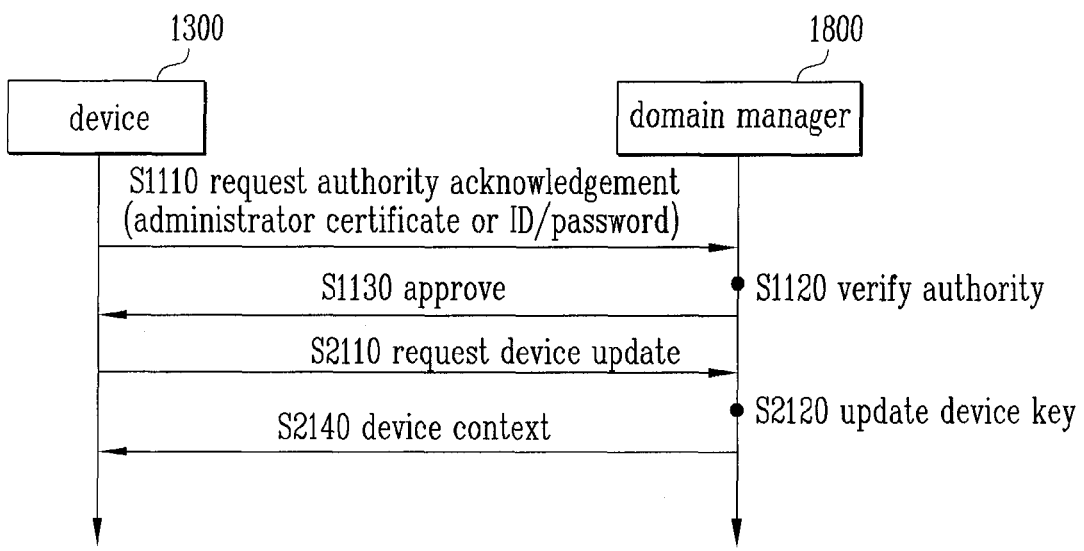
FIG. 20 is a flowchart of a device update method according to an exemplary embodiment of the present invention.

In updating a device registered in the domain manager 1800, the domain administrator requests the domain manager 1800 to update the device (S2110 of FIG. 20). The domain manager 1800 updates a device security means (S2120), and transmits a domain device resource including the device security means to the device 1300 which has requested the device update (S2140). While a device key has been shown as the device security means in FIG. 20, the device security means may be implemented as another security means such as a certificate. The device 1300 which has received the updated domain device resource may store it in its internal memory.

A license provider requires a domain key, a user key, and a device key to issue a license associated with the domain. A content key may be encrypted with a public key of the domain, included in the license, and transmitted to all users included in the domain in order to issue a license allowing the users to use contents using all devices. To allow any user to use the content using any of his/her devices, the content key may be encrypted with a public key of the user, further encrypted with a public key of the domain, and transmitted. In contrast, to allow all users to use a content using a specific device, a content key may be encrypted with a public key of the device, further encrypted with a public key of the domain, and transmitted. To allow one user to use a content using a specific device, a content key may be encrypted with a public key of the device, further encrypted with a public key of the user, further encrypted with a public key of the domain, and transmitted. Accordingly, various license policies including the case that any number of users and any number of devices are composed using the users and devices included in the domain to constitute a sub domain and issue a license can be established.

Second Embodiment

A domain system according to the present embodiment uses a separate domain controller for managing a domain at the side of a user. In the present embodiment, the domain controller is a constitutional unit of the domain. One domain may include only one domain controller and the domain controller may be one multimedia reproduction device.

For clarity of description, a digital content protection and management system associated with the domain system of the present embodiment will also be described. The domain system of the present embodiment may be used with various types of the digital content protection and management system, however, a description thereof will be limited to a specific digital content protection and management system for describing the domain system for simplicity of description.

Figure 21:
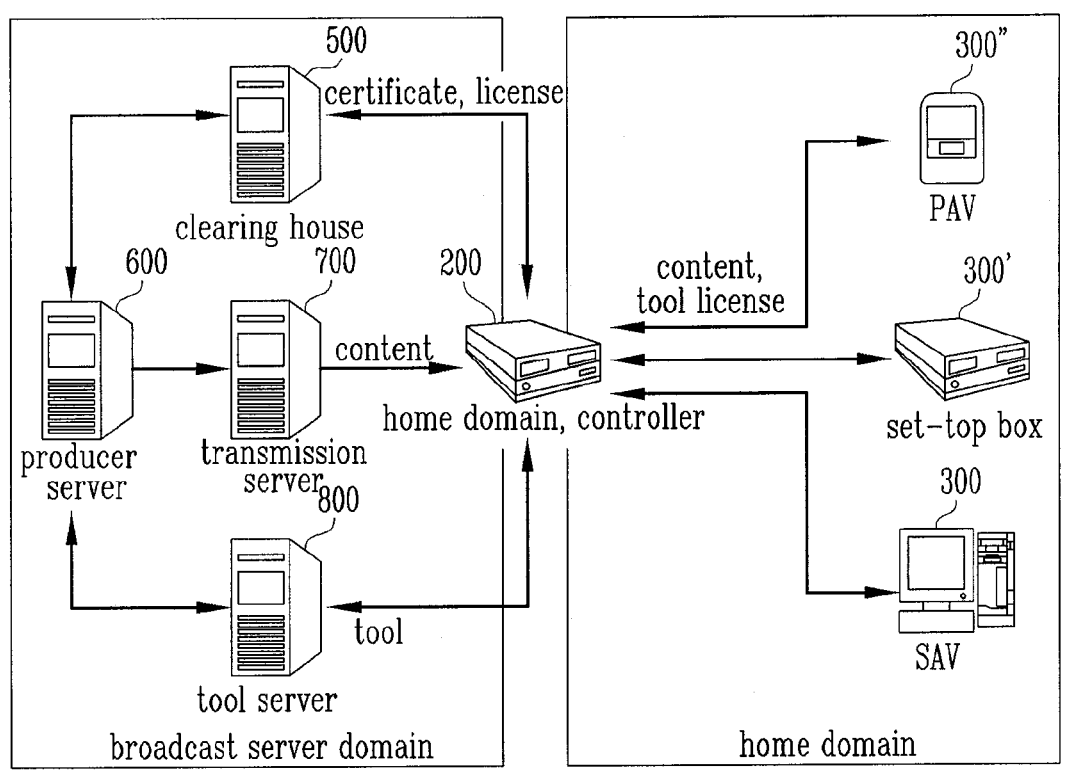
FIG. 21 shows the structure of a content protection management system including a domain according to other embodiments of the present invention.
Figure 22:
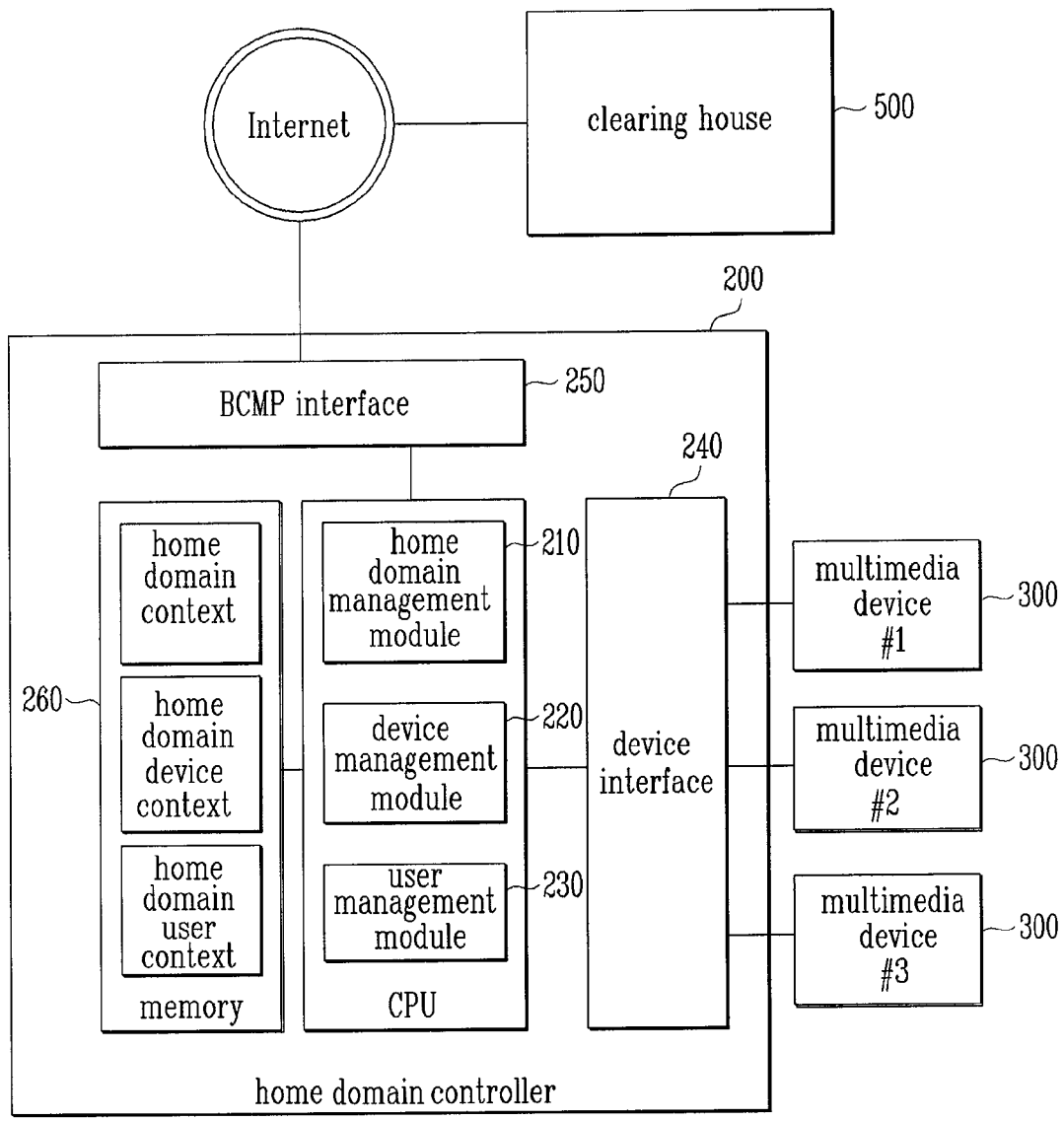
FIG. 22 is a block diagram of an internal structure of a domain controller according to other embodiments of the present invention.

A broadcast content protection and management system of FIG. 21 is composed of a producer server 600 of a content provider, a transmission server 700 for transmitting the content input from the producer server to each service subscriber, a clearing house 500 for performing authentication on each subscriber and/or content, and a tool server 800 for managing tools for encoding and decoding content data.

The producer server 600 is a server which writes information for protecting and managing the broadcast content, and, in conjunction with the tool server 800, acts to transmit content information (protection stream) to be protected and managed to the transmission server 700. That is, it registers contents to be broadcast on the clearing house 500, and receives information necessary for distribution (e.g., a content ID, a public key of a clearing house, a URL of the clearing house, etc.). In addition, it determines a tool to be applied to the content, and receives information about the tool (e.g., a tool ID, a tool descriptor, etc.). When there is no tool in the tool server 800, the producer server 600 may register a new tool and its descriptor on the tool server 800 and may be given a new tool ID.

The transmission server 700 transmits the protection stream input from the producer server 600 to the domain controller 200 of the service subscriber. The protection stream may be converted to a predetermined format and transmitted if necessary. The conversion may be made by the tool registered in the tool server 800 according to the implemented format. In performing the format conversion without the use of the tool server 800, the producer server 600 may transmit information about the tool to be applied in the transmission server 800 as a separate syntax file upon transmitting information about distribution, tool, storage, and the like in the form of a syntax file to the transmission server 700.

The tool server 800 manages tools to be applied to the broadcast content. Specifically, the tool server 800 systematically manages encoding/decoding, scrambling/descrambling, and/or watermarking/fingerprinting tools for broadcast contents.

The clearing house 500 is a kind of server system. The clearing house 500 performs a function of issuing a license including permission and conditions for controlling use, distribution, and the like of contents by a user, a function of billing, payment, and accounting for content use, and a function of authenticating user/device/content/domain. The clearing house 500 may be an integrated authentication system of a broadcast standardization authority for integrated digital broadcast provision, or may be a separate authentication system of each broadcast station.

The content protection and management system is used in conjunction with the domain system of the invention comprising a plurality of content execution devices and/or users in one domain. To this end, an authentication data storing module of the clearing house 500 may have information about devices and/or users in each domain, and the authentication execution module may perform a procedure of registering on devices and/or users in each domain.

In the home domain system of the present embodiment, one domain controller defines one domain, and each domain includes a plurality of users and devices. The domain controller may serve as a multimedia reproduction device, like a digital broadcast receiving set-top box. The domain controller may perform only domain management. As such, the domain controller plays a major role in defining domains and managing users and/or devices. The description will now be given based on the domain controller.

In a domain system for connecting to, as client, a BCMP system including a writing-transmission server for creating information for protection and management of broadcast contents, a tool server for managing several tools, and a service provider server for managing license, authentication, and payment, the domain-applied broadcast system of the present invention includes a domain controller for defining one domain, and at least one domain device for performing broadcast contents.

The domain controller in a domain applied broadcast system according to the present embodiment includes a BCMP interface for connecting to an external service provider server and performing data communication, a domain management module for performing a domain registration task on the service provider server, a user management module for performing a domain user change task on the service provider server; a device interface for performing data communication with the domain device belonging to the same domain, a device management module for performing a domain device change task on the service provider server, and an internal recording medium for storing the domain context indicating a structure of the registered domain.

The domain context structure for representing the domain structure of the present invention includes a domain identifier for specifying the domain as a region containing at least one content user and at least one content reproduction device, a domain certificate for guaranteeing authenticity of the domain, a service provider address for indicating a location of an external service provider server integrally managing authentication data with respect to the domain service, a domain administrator identifier for specifying the domain administrator having a management authority with respect to the domain, and service period information for indicating a valid period of the domain service.

A concept of a domain, and a domain context, a domain user context, and a domain device context for domain operations, which are characteristics of the present invention, will now be described.

In the following description, a server of a service provider for managing the domain according to the present invention is a clearing house as shown in FIG. 21. This is only an example for better understanding of the invention. Accordingly, the term, clearing house, is referred to not only any server of FIG. 21 or another service provider server different from that of FIG. 21 but also any server performing the described functions throughout the specification.

The context of the domain of the present invention indicates a structure of a domain, and is a data collection where its constitutional elements are recorded. The context is provided in the clearing house and the domain controller in a format recorded on a physical recording medium such as a memory. Table 1 below illustrates an example of the domain context described in XML format.

TABLE 1

```
<xsd:element name="DomainManageInfo">
    <xsd:complexType>
        <xsd:sequence>
            <xsd:element ref="dmpmd:Domain_ID"/>
            <xsd:element ref="dmpmd:AccessID"/>
            <xsd:element ref="dmpmd:Domain_Key"/>
            <xsd:element ref="dmpmd:AdministratorID"/>
            <xsd:element ref="dmpmd:UserIDList"/>
            <xsd:element ref="dmpmd:DeviceIDList"/>
            <xsd:element name="MaximumNumberOfUser" type="xsd:integer"/>
            <xsd:element name="MaximumNumberOfDevice" type="xsd:integer"/>
            <xsd:element name="MaximumFrequencyOfUpdateOfUser"
```

TABLE 1-continued

```
            type="xsd:integer"/>
                <xsd:element name="MaximumFrequencyOfUpdateOfDevice"
        type="xsd:integer"/>
                <xsd:element ref="dmpmd:RevocationListOfUser"/>
                <xsd:element ref="dmpmd:RevocationListOfDevice"/>
                <xsd:element name="Registration" type="xsd:dateTime"/>
            </xsd:sequence>
        </xsd:complexType>
</xsd:element>
```

The context may be provided in some or all of domain devices if necessary. The domain context may include essential items such as a domain identifier ID, a domain certificate, a domain controller identifier ID, a domain administrator identifier ID, service period information, and additional items such as a clearing house address URL, a domain controller address URL, a user list, a device list, or the like. Each of them will be described below.

1. Domain ID (Domain_ID): ID allocated to each domain in a non-overlapping manner upon new domain registration, and conserved and managed until the domain registration is canceled (terminated)

2. Domain certificate (Domain_Key): A public certificate of the domain. This is issued upon domain registration and may be updated for management 3. Domain controller ID (DomainManager_ID): At least one domain controller should be registered in all domains. This ID is a device ID allocated to the domain controller, and preferably has the same structure as the general structure of the domain device ID.

4. Domain administrator ID (manager_ID): At least one domain administrator should be registered in all domains. This ID is a user ID allocated to the domain administrator, and preferably has the same structure as the general structure of the domain user ID.

5. Clearing house URL: A URL is stored which is an address on the Internet of the clearing house for integrally managing authentication data with respect to the domain service.

6. Domain controller URL: A URL is stored which is an address on the Internet of the domain controller.

7. A list of user IDs (UserIDList): A list of user IDs for identifying users (content consumers) registered in a domain is stored.

8. A list of device IDs (DeviceIDList): a list of device IDs for identifying devices (multimedia content reproducing devices) registered in the corresponding domain is stored.

One user may have several devices and one device may be shared by several users, so that a relationship of users to their devices is N:M. The relationship may be recorded in a manner of recording a list of IDs to the devices for each user ID or in a manner of recording a list of IDs of users permitted for use each device ID 9. A list of canceled user IDs (RevocationListOfUser): For convenience of management and for recovery from malfunction, a record about IDs of users who have been registered as constitutional element of the domain and then canceled can be retained for a predetermined period.

10. A list of canceled device IDs (RevocationListOfDevice): For convenience of management and for recovery from malfunction, a record about IDs of devices which have been registered as constitutional element of the domain and then canceled can be retained for a predetermined period.

11. The maximum number of users (MaximumNumberOfUser): For convenience of domain management, it is preferable to limit the number of users who can be included in one domain.

12. The maximum number of devices (MaximumNumberOfDevice): For convenience of domain management, it is preferable to limit the number of devices which can be included in one domain. In general, this number is greater than the maximum number of users.

13. The maximum frequency of user updates (MaximumFrequencyOfUpdateOfUser): Since too frequent change in domain user puts a significant load on the domain management, the frequency of updating the domain users may be limited.

14. Maximum frequency of device updates (MaximumFrequencyOfUpdateOfDevice): Since too frequent change in domain device puts a significant load on the domain management, the frequency of updating the domain devices may be limited.

15. Registration date (registration): one of service period information indicating a date when the domain is registered on the clearing house.

16. Termination date: one of service period information indicating a date when the domain service is terminated. It is set to NULL when the domain is in service. It may be a date when the service is to be terminated if necessary.

An example of detailed item contexts constituting the domain context is described in Table 2 below.

TABLE 2

```
<xsd:element name="UserIDList">
    <xsd:complexType>
        <xsd:sequence minOccurs="0" maxOccurs="unbounded">
            <xsd:element ref="dmpmd:UserID"/>
            <xsd:element ref="dmpmd:DeviceIDListForUser"/>
            <xsd:element name="Expiration"
                type="sx:ValidityTimeMetered"/>
        </xsd:sequence>
    </xsd:complexType>
</xsd:element>
<xsd:element name="DeviceIDList">
    <xsd:complexType>
        <xsd:sequence minOccurs="0" maxOccurs="unbounded">
            <xsd:element ref="dmpmd:DeviceID"/>
            <xsd:element ref="dmpmd:UserIDListForDevice"/>
            <xsd:element name="Expiration"
                type="sx:ValidityTimeMetered"/>
        </xsd:sequence>
    </xsd:complexType>
</xsd:element>
<xsd:element name="RevocationListOfUser">
    <xsd:complexType>
        <xsd:sequence minOccurs="0" maxOccurs="unbounded">
            <xsd:element ref="dmpmd:UserID"/>
        </xsd:sequence>
    </xsd:complexType>
</xsd:element>
<xsd:element name="RevocationListOfDevice">
    <xsd:complexType>
```

TABLE 2-continued

```
        <xsd:sequence minOccurs="0" maxOccurs="unbounded">
            <xsd:element ref="dmpmd:DeviceID"/>
        </xsd:sequence>
    </xsd:complexType>
</xsd:element>
```

Domain_ID, Manager_ID, UserID, DeviceID, and AccessID shown in Table 2 are IDs defined as shown in Table 3 below.

TABLE 3

```
<xsd:element name="Domain_ID" type="r:KeyHolder"/>
<xsd:element name="DomainManager_ID" type="xsd:anyURI"/>
<xsd:element name="SubDomain_ID" type="xsd:anyURI"/>
<xsd:element name="Domain_Key" type="xenc:EncryptedKeyType"/>
<xsd:element name="AdministratorID" type="r:KeyHolder"/>
<xsd:element name="UserID" type="r:KeyHolder"/>
<xsd:element name="DeviceID" type="r:KeyHolder"/>
<xsd:element name="AccessID" type="r:KeyHolder"/>
```

FIG. 3 is an XML structure of the UserID of the present invention. It can be seen that the structure includes a license and a key pair value for each ID shown in Tables 1 to 3.

The domain of the invention contains at least one domain user having a permission to use a multimedia content which is purchased under a name of the domain, as its constitutional item. That is, the domain user, as a user added to the domain, can be given a permission to use the device belonging to the domain. The domain administrator who is registered when the domain is created also becomes one domain user.

Users belonging to a domain may be defined in several grades so that a determination as to whether the users are allowed to access the broadcast content is made. For example, the users can be classified into adults, juveniles and children so that access to the content is controlled.

An original settlement duty according to the use of broadcast content is vested on the domain administrator, but users may be defined as a user to be given settlement duty and users to be not given settlement duty, if necessary. That is, a non-domain manager may give the settlement duty to a user having settlement capability in order to allow the user to purchase and use the content without the help of the domain administrator. Users to be given settlement duty must be registered on the clearing house for billing and users to be not given settlement duty may not be registered on the clearing house. However, purchase of the content is made only under a name of a user (including a administrator) having the settlement duty.

In order to include the user in the domain, the domain administrator should perform the addition through the domain controller.

That is, the domain controller requests the clearing house to register a user, receives and manages an issued certificate of the corresponding user from the clearing house, and transmits the certificate to each user.

In principle, at least one domain device should be set for all domain users. When there is no device allocated to the domain user, the user is regarded as a user revoked from the domain and may not obtain the license from the clearing house. An available domain device can be differently defined for each domain user.

The domain user context of the present invention is a data collection indicating users belonging to the domain, and is provided in the domain controller in a format recorded on a physical recording medium such as a memory. The context may be provided in some or all of the corresponding devices if necessary, or may be provided in the clearing house.

The domain user context is an essential item, and includes a user identifier for specifying any one user among several users belonging to one domain, a domain identifier for specifying the domain, a domain certificate for indicating authenticity of the domain, a clearing house address indicating a location of a clearing house to which the domain belongs, and registration period information indicating the registration period to the domain.

The domain user context is a context to be created when the user of the domain is registered. The domain user context is a context issued by the clearing house in the case of the domain user registered on the clearing house, and is a context created by the domain controller in other cases. Each constitutional item that can be included in the domain context as described in Table 4 below will be described below.

TABLE 4

```
<xsd:complexType name="DomainUserResource">
    <xsd:complexContent>
        <xsd:extension base="r:Resource">
            <xsd:sequence>
                <xsd:element ref="dmpmd:DomainManager_ID"/>
                <xsd:element ref="dmpmd:Domain_ID"/>
                <xsd:element ref="dmpmd:UserID"/>
                <xsd:element name="AddedUser" type="xsd:boolean"/>
                <xsd:element name="GradeOfUser" type="xsd:unsignedInt"/>
                <xsd:element name="DomainKey" type="dsig:KeyInfoType"/>
                <xsd:element ref="dmpmd:DeviceIDListForUser"/>
                <xsd:element name="Registration" type="xsd:dateTime"/>
                <xsd:element name="Expiration" type="sx:ValidityTimeMetered" minOccurs="0"/>
                <xsd:element name="TransactionID" type="xsd:unsignedByte" minOccurs="0"/>
            </xsd:sequence>
        </xsd:extension>
    </xsd:complexContent>
</xsd:complexType>
<xsd:element name="DeviceIDListForUser">
    <xsd:complexType>
        <xsd:sequence minOccurs="0" maxOccurs="unbounded">
            <xsd:element ref="dmpmd:DeviceID"/>
            <xsd:element name="Expiration" type="sx:ValidityTimeMetered"/>
        </xsd:sequence>
    </xsd:complexType>
```

TABLE 4-continued

```
</xsd:element>
```

In the present embodiment, domain contexts for only a domain administrator and a user who should pay a fee are created by the clearing house. However, a domain user context may be created by the clearing house in order to further enhance copyright protection.

1. User ID (UserID): ID allocated to each domain user in a non-overlapping manner upon registering a new domain user, and conserved and managed until the domain user registration is canceled. The user ID may include a Register at Clearing House flag. The user ID is an ID (global ID) issued by the clearing house when the flag value is True, and is an ID (local ID) issued by the domain controller when the flag value is False. The global ID and the local ID may have different formats.

2. User Certificate: It is a public certificate of a domain user, and is issued upon domain user registration. It can be updated for management. The certificate may be issued in a local certificate format that is used only on a corresponding domain by the domain controller.

3. Domain Certificate (Domain_Key): It is a public certificate of a domain to which a user belongs, and preferably is the same as that included in the domain context.

4. User Grade information (GradeOfUser): Domain users can be grouped according to many conditions. This may be used for a domain controller to make and apply a rule according to content use.

5. Clearing house URL: This is a URL of a clearing house to which a domain of a domain user belongs. Since the URL overlaps the URL included in the domain context, it may be omitted if necessary.

6. Domain controller URL: This is a URL of a controller for a domain to which a user belongs. Since the URL overlaps the URL included in the domain context, it may be omitted, if necessary.

7. Domain ID (Domain_ID): An ID of a domain to which a domain user belongs.

8. List of device IDs allocated to a user (DeviceIDListForUser): A list of devices that are permitted for use by a domain user 9. Registration date (Registration): Registration period information indicating a date when a user is registered on the domain.

10. Expiration date (Expiration): Registration period information indicating a date when a user is revoked from the domain. It is set to NULL for a registered user. It may indicate a future date when the registration is to be terminated if necessary.

The domain of the invention contains at least one domain device which can reproduce a multimedia content purchased under a name of the domain, as its constitutional item. That is, the domain device means a device added to the domain. In the present system, the devices need to be included in respective domains which are classified by the domain controller so as to use all the devices. To include a domain device in a domain, the domain administrator must request the clearing house to include the domain device in the domain via the domain controller using the device. That is, the domain controller requests the clearing house to register the device, receives and manages an issued certificate for the device from the clearing house, and delivers the certificate to the device.

Even a device belonging to the domain may be regarded to be an unusable state, i.e., a paused state and may not be used when users permitted to use the device are not defined. Accordingly, at least one user must be defined in order to use the device (the user may be defined in an overlapping manner). A grade of the device can be determined according to a grade of a domain user who is an owner of the device.

The domain device context of the invention is a data collection indicating devices belonging to the domain, and is provided in the domain controller and the clearing house in a format recorded on a physical recording medium such as a memory. Each device may have its domain device context if necessary.

The domain device context as described in Table 5 below includes, as essential items, a device identifier ID for specifying any one device among several devices included in one domain, a device certificate for indicating authenticity of the device, a domain identifier ID for specifying the domain, a domain certificate for indicating authenticity of the domain, a clearing house address indicating a location of the clearing house to which the domain belongs, and registration period information indicating a registration period to the domain.

TABLE 5

```
<xsd:complexType name="DomainDeviceResource">
    <xsd:complexContent>
        <xsd:extension base="r:Resource">
            <xsd:sequence>
                <xsd:element ref="dmpmd:DomainManager_ID"/>
                <xsd:element ref="dmpmd:Domain_ID"/>
                <xsd:element ref="dmpmd:DeviceID"/>
                <xsd:element name="DomainKey" type="dsig:KeyInfoType"/>
                <xsd:element ref="dmpmd:UserIDListForDevice"/>
                <xsd:element name="Registration" type="xsd:dateTime"/>
                <xsd:element name="Expiration" type="sx:ValidityTimeMetered"
minOccurs="0"/>
                <xsd:element name="TransactionID" type="xsd:unsignedByte"
minOccurs="0"/>
            </xsd:extension>
        </xsd:complexContent>
</xsd:complexType>
<xsd:element name="UserIDListForDevice">
    <xsd:complexType>
        <xsd:sequence minOccurs="0" maxOccurs="unbounded">
```

TABLE 5-continued

```
        <xsd:element ref="dmpmd:UserID"/>
        <xsd:element name="Expiration" type="sx:ValidityTimeMetered"/>
    </xsd:sequence>
  </xsd:complexType>
</xsd:element>
```

The domain device context is created by the clearing house when the device is registered. This is because that the content copyright protection associated with the present invention is more effectively made according to a content reproduction device based policy than a user based policy.

The domain device context can be stored and managed in the clearing house, the domain controller and the corresponding domain device. Items of the domain device context are as follows.

1. Device ID (DeviceID): ID allocated to each domain device in a non-overlapping manner upon registering a new domain device, and conserved and managed until the domain device registration is canceled 2. Device certificate: A public certificate of the domain device. This is issued upon domain device registration and can be updated for management. Preferably, the clearing house issues the device certificate.

3. Domain certificate (Domain_Key): A public certificate of a domain to which a user belongs.

4. Domain ID (Domain_ID): An ID of the domain to which the domain device belongs.

5. Clearing house URL: A URL of a clearing house to which the domain of the domain user belongs. It may be omitted, if necessary.

6. Domain controller URL: A URL of a domain controller to which the user belongs. It may be omitted, if necessary.

7. Domain administrator ID: A domain administrator ID for a domain to which the domain device belongs. This is an ID of a user registering the domain device. It may be omitted, if necessary.

8. Device user ID list (UserIDListForDevice): A list of users permitted to use the domain device.

9. Registration date (Registration): Registration period information indicating the date when the domain device is registered.

10. Expiration date (Expiration): Registration period information indicating the date when the registration of the domain device is terminated. It may indicate future date when the registration is to be terminated if necessary.

In the present embodiment, the registration, user change, and device change are all performed by the domain controller. The domain controller will now be described.

The domain controller of the present embodiment is a constitutional element at the side of client within the broadcast content providing system of FIG. 1, and includes a BCMP interface 250 for connecting to the clearing house 500 as a constitutional element at the side of server and performing data communication, a domain management module 210 for performing a domain registration task on the clearing house 500, a user management module 230 for performing a domain user change task on the clearing house 500, a device interface 240 for performing data communication with the domain device 300 belonging to the same domain, a device management module 220 for performing a domain device change task on the clearing house 500, and an internal recording medium 260 for storing a domain context indicating a structure of the registered domain.

The domain management module 210, the user management module 230, and the device management module 220 may be implemented as separate hardware, however, are preferably implemented as program modules executed on a CPU of the domain controller. Since the most convenient means for connecting to the remote clearing house 500 is the Internet, the BCMP interface 250 preferably includes an Internet connection means such as an Ethernet card.

The device interface 240 is equipment for establishing a data communication channel with the multimedia device 300 belonging to the domain. Since the communication between the domain device 300 and the domain controller 200 is mainly carried out within a local area, the device interface may be implemented as an interface device for a local area wired communication such as a USB cable, a serial/parallel cable, or an interface device for a local area wireless communication such as Bluetooth or wireless LAN. However, to enhance the convenience for the user, the device interface may be implemented as an interface device for a private communication channel on the Internet such as a Virtual Private Networks (VPN) or a private communication channel on a mobile radio communication network. Here, the interface device may be implemented as hardware and/or software.

The internal recording medium 260 may be implemented by electromagnetically writable, non-volatile recording medium such as a flash memory, an EEPROM, a disk recording device, or the like, and is preferably implemented to store the domain certificate input from the clearing house at the time of domain registration.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A domain management method for managing a domain composed of at least one user and at least one device using a domain manager, wherein the domain manager is not included in the domain, the domain management method comprising:

requesting, by a device of a domain administrator who is one user in the domain, the domain manager to register a domain in accordance to a contract with a service provider;

creating, by the domain manager, new domain management information (DMI) and a domain user resource for the domain administrator, wherein the (DMI) comprises: a domain ID, a domain key, an administrator ID and an administrator key of the domain administrator, a user ID list, a device ID list, a maximum number of users, a maximum number of devices, a maximum frequency update of user, a maximum frequency of device, a revocation list of user, a revocation list of device, and a registration domain date; and the domain user resource comprises: a domain ID, a domain key, a user ID, a user key and a list of devices permitted to be used by a user;

transmitting, by the domain manager, the domain user resource for domain administrator to the device of the domain administrator;

storing the domain user resource in the device of the domain administrator;

requesting, by the device of the domain administrator, the domain manager to add a user;

modifying, by the domain manager, the DMI to insert into the user ID list an ID of the user requested to add and creating, by the domain manager, a domain user resource for the user requested to add; and transmitting the domain user resource for the added user from the domain manager to the device of the domain administrator, wherein the device of the domain administrator forwards the domain user resource to a device of the added user.

2. The method of claim 1, further comprising:

requesting, by the device of the domain administrator, the domain manager to remove the registered domain;

invalidating, by the domain manger, the DMI associated with the domain requested for removal; and transmitting a removal completion signal from the domain manager transmit to the device of the domain administrator.

3. The method of claim 1, further comprising:

requesting, by the device of the domain administrator, the domain manager to update the registered domain;

updating the DMI associated with the domain requested to update by the domain manager; and transmitting the updated DMI from the domain manager to the device of the domain administrator.

4. The method of claim 1, further comprising:

requesting, by the device of the domain administrator, the domain manager to revoke a user;

modifying, by the domain manager, the DMI to remove the user requested for revocation from the user ID; and transmitting a removal completion signal from the domain manager to the device of the domain administrator.

5. The method of claim 1, further comprising:

requesting, by the device of the domain administrator, the domain manager to add a device;

modifying, the domain manager, the domain management information to include an ID of the device requested to add and creating, by the domain manager, a domain device resource for the added device, wherein the domain device resource comprises: a device ID, a device key, a domain ID, a domain key and a list of users permitted to use the device; and transmitting the domain device resource for the added device from the domain manager to the device of the domain administrator.

6. The method of claim 5, further comprising the steps of:

requesting, by the device of the domain administrator, the domain manager to revoke a device;

modifying, by the domain manager, the DMI to remove the device requested for revocation from the device ID list; and transmitting a removal completion signal from the domain manager to the device of the domain administrator.

7. The method of claim 1, further comprising:

in order to verify authenticity of the domain administrator, transmitting domain administrator authentication information from the device of the domain administrator to the domain manager;

verifying, by the domain manager, the domain administrator authentication information; and transmitting an approval signal from the domain manager to the device of the domain administrator after the verification.

8. A domain controlling device for controlling at least one user and at least one device within a domain that the domain controlling device belongs to, comprising:

an interface configured to connect to an external service provider server to communicate with the service provider server;

a domain management module configured to generate, update and delete the domain management information (DMI) for a domain on the service provider server, wherein the DMI includes a domain ID, a domain key, a domain controller ID, a domain administrator ID, a clearing house URL, a domain controlling device URL, a list of user IDs, a list of device IDs, a list of canceled user IDs, a list of canceled device IDs, a maximum number of users, a maximum number of devices, a maximum frequency of user updates, a maximum frequency of device updates, a registration date, and a termination date;

a user management module configured to generate, update and delete domain user resource information for each user in the domain on the service provider server;

a device interface configured to communicate with another device belonging to the same domain;

a device management module configured to generate, update and delete domain device resource information for each device in the domain on the service provider server; and a storage configured to store the DMI, the domain user resource information and the domain device resource information.

9. The domain controlling device of claim 8, wherein the domain user resource information includes a user ID, a user key, a domain ID, a domain key and a list of devices permitted to use by the user.

10. The domain controlling device of claim 8, wherein the domain device resource information includes a device ID, a device key, a domain ID, a domain key and a list of users permitted to use the device.

* * * * *